US012665485B2

(12) United States Patent
Khlat

(10) Patent No.: US 12,665,485 B2
(45) Date of Patent: Jun. 23, 2026

(54) MULTI-VOLTAGE POWER MANAGEMENT INTEGRATED CIRCUIT

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 132 days.

(21) Appl. No.: 18/734,057

(22) Filed: Jun. 5, 2024

(65) Prior Publication Data

US 2025/0023463 A1 Jan. 16, 2025

Related U.S. Application Data

(60) Provisional application No. 63/513,386, filed on Jul. 13, 2023.

(51) Int. Cl.
*H02M 1/00* (2006.01)

(52) U.S. Cl.
CPC ................................. *H02M 1/0025* (2021.05)

(58) Field of Classification Search
CPC ..... H02M 1/0025; H02M 1/008; H03F 3/195; H03F 3/245; H03F 1/0216
See application file for complete search history.

(56) References Cited

U.S. PATENT DOCUMENTS

| | | | |
|---|---|---|---|
| 9,634,577 B2 | 4/2017 | Perreault | |
| 10,097,145 B1 | 10/2018 | Khlat et al. | |
| 10,103,926 B1 | 10/2018 | Khlat | |

| | | | |
|---|---|---|---|
| 10,270,345 B1 | 4/2019 | Kotikalapoodi | |
| 10,439,557 B2 | 10/2019 | Khlat et al. | |
| 10,523,120 B2 | 12/2019 | Youn et al. | |
| 10,790,786 B2 | 9/2020 | Henzler et al. | |
| 10,797,649 B2 | 10/2020 | Khlat | |
| 11,018,638 B2 | 5/2021 | Khlat et al. | |
| 11,108,363 B2 | 8/2021 | Khlat | |
| 11,165,393 B2 | 11/2021 | Pehlke | |
| 11,349,436 B2 | 5/2022 | Khlat | |

(Continued)

FOREIGN PATENT DOCUMENTS

| | | |
|---|---|---|
| CN | 116505631 A | 7/2023 |
| WO | 2021262185 A1 | 12/2021 |

OTHER PUBLICATIONS

Extended European Search Report for European Patent Application No. 24166661.9, mailed Aug. 7, 2024, 8 pages.

*Primary Examiner* — Kyle J Moody
(74) *Attorney, Agent, or Firm* — Withrow & Terranova, P.L.L.C.

(57) ABSTRACT

A multi-voltage power management integrated circuit (PMIC) is disclosed. More specifically, the multi-voltage generation circuit includes multiple voltage modulation circuits each configured to generate and maintain a respective one of multiple modulated voltages based on a battery voltage and a respective one of multiple reference voltages. Contrary to using multiple voltage-current modulation circuits, such as direct-current-direct-current (DC-DC) converters, to generate the multiple reference voltages, the multi-voltage PMIC is configured to share a single voltage-current modulation circuit among the multiple voltage modulation circuits. As such, the multi-voltage PMIC can concurrently support multiple load circuits (e.g., power amplifier circuits) with a significantly reduced footprint.

20 Claims, 10 Drawing Sheets

(56)     References Cited

U.S. PATENT DOCUMENTS

| 11,424,719 | B2 | | 8/2022 | Khlat | |
| 11,539,330 | B2 | * | 12/2022 | Khlat | H03F 3/19 |
| 11,637,531 | B1 | * | 4/2023 | Perreault | H03F 1/0227 |
| | | | | | 330/297 |
| 11,677,365 | B2 | | 6/2023 | Khlat | |
| 12,265,442 | B2 | * | 4/2025 | Khlat | H02M 3/077 |
| 2009/0191826 | A1 | | 7/2009 | Takinami et al. | |
| 2012/0194274 | A1 | | 8/2012 | Fowers et al. | |
| 2016/0006397 | A1 | | 1/2016 | Wimpenny | |
| 2017/0194857 | A1 | | 7/2017 | Hang et al. | |
| 2018/0034418 | A1 | | 2/2018 | Blednov | |
| 2018/0309411 | A1 | | 10/2018 | Cabrera et al. | |
| 2020/0274494 | A1 | | 8/2020 | Khlat | |
| 2021/0083627 | A1 | | 3/2021 | Sakata et al. | |
| 2021/0099136 | A1 | | 4/2021 | Drogi et al. | |
| 2021/0194517 | A1 | | 6/2021 | Mirea et al. | |
| 2021/0226585 | A1 | | 7/2021 | Khlat | |
| 2022/0200447 | A1 | | 6/2022 | Khlat | |
| 2023/0066436 | A1 | | 3/2023 | Rutkowski | |
| 2023/0118768 | A1 | | 4/2023 | Khlat | |
| 2023/0124941 | A1 | | 4/2023 | Khlat | |
| 2023/0216409 | A1 | | 7/2023 | Ravi et al. | |
| 2024/0014787 | A1 | | 1/2024 | Khalt | |
| 2025/0070730 | A1 | | 2/2025 | Granger-Jones et al. | |

* cited by examiner $V_{CC1}-V_{CCN}$ $C_{FLY2}$ $C_{FLY1}$

INTERNAL SWITCHING MECHANISM

μCBB 30

$V_{BAT}$ $V_{BAT} - V_{REFi} \in (V_{REF1}-V_{REFN})$ $V_{REF1}-V_{REFN}$ $C_{FLY1}$ $C_{FLY2}$

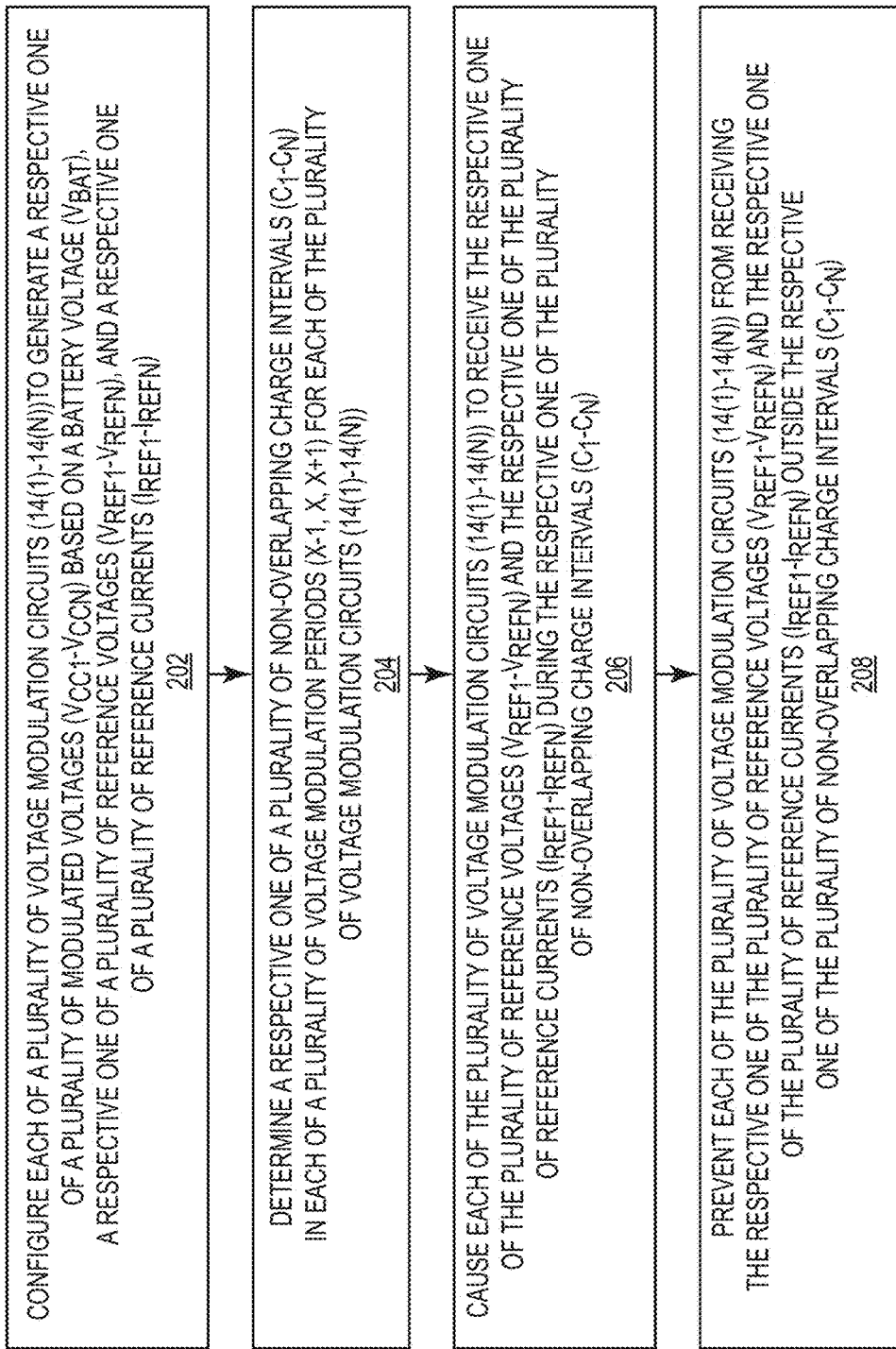

200

CONFIGURE EACH OF A PLURALITY OF VOLTAGE MODULATION CIRCUITS (14(1)-14(N)) TO GENERATE A RESPECTIVE ONE OF A PLURALITY OF MODULATED VOLTAGES ($V_{CC1}$-$V_{CCN}$) BASED ON A BATTERY VOLTAGE ($V_{BAT}$), A RESPECTIVE ONE OF A PLURALITY OF REFERENCE VOLTAGES ($V_{REF1}$-$V_{REFN}$), AND A RESPECTIVE ONE OF A PLURALITY OF REFERENCE CURRENTS ($I_{REF1}$-$I_{REFN}$)
202

DETERMINE A RESPECTIVE ONE OF A PLURALITY OF NON-OVERLAPPING CHARGE INTERVALS ($C_1$-$C_N$) IN EACH OF A PLURALITY OF VOLTAGE MODULATION PERIODS (X-1, X, X+1) FOR EACH OF THE PLURALITY OF VOLTAGE MODULATION CIRCUITS (14(1)-14(N))
204

CAUSE EACH OF THE PLURALITY OF VOLTAGE MODULATION CIRCUITS (14(1)-14(N)) TO RECEIVE THE RESPECTIVE ONE OF THE PLURALITY OF REFERENCE VOLTAGES ($V_{REF1}$-$V_{REFN}$) AND THE RESPECTIVE ONE OF THE PLURALITY OF REFERENCE CURRENTS ($I_{REF1}$-$I_{REFN}$) DURING THE RESPECTIVE ONE OF THE PLURALITY OF NON-OVERLAPPING CHARGE INTERVALS ($C_1$-$C_N$)
206

PREVENT EACH OF THE PLURALITY OF VOLTAGE MODULATION CIRCUITS (14(1)-14(N)) FROM RECEIVING THE RESPECTIVE ONE OF THE PLURALITY OF REFERENCE VOLTAGES ($V_{REF1}$-$V_{REFN}$) AND THE RESPECTIVE ONE OF THE PLURALITY OF REFERENCE CURRENTS ($I_{REF1}$-$I_{REFN}$) OUTSIDE THE RESPECTIVE ONE OF THE PLURALITY OF NON-OVERLAPPING CHARGE INTERVALS ($C_1$-$C_N$)
208

FIG. 7

MULTI-VOLTAGE POWER MANAGEMENT INTEGRATED CIRCUIT

RELATED APPLICATIONS

This application claims the benefit of U.S. provisional patent application Ser. No. 63/513,386, filed on Jul. 13, 2023, the disclosure of which is hereby incorporated herein by reference in its entirety.

FIELD OF THE DISCLOSURE

The present disclosure is related to a power management integrated circuit (PMIC) operable to maintain multiple voltages simultaneously.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by such advanced wireless communication technologies as fifth-generation new-radio (5G-NR). To achieve higher data rates, a mobile communication device may employ a power amplifier(s) to amplify a radio frequency (RF) signal(s) (e.g., maintaining sufficient energy per bit) before transmission. Given that the power amplifier(s) requires a supply voltage(s) for operation, a power management integrated circuit (PMIC) is thus required to generate and provide the supply voltage(s) to the power amplifier(s).

Given that the PMIC often needs to concurrently generate multiple supply voltages for multiple power amplifiers, the PMIC typically includes multiple direct-current to direct-current (DC-DC) converters for modulating the multiple supply voltages. Having the multiple DC-DC converters will inevitably increase a footprint of the PMIC, thus making it difficult to fit the PMIC into an increasingly miniaturized electronic device(s) such as a smartphone and smart gadget. Hence, it is desirable to reduce the number of DC-DC converters in the PMIC to help reduce the footprint of the PMIC.

SUMMARY

Embodiments of the disclosure relate to a multi-voltage power management integrated circuit (PMIC). More specifically, the multi-voltage generation circuit includes multiple voltage modulation circuits each configured to generate and maintain a respective one of multiple modulated voltages based on a battery voltage and a respective one of multiple reference voltages. Contrary to using multiple voltage-current modulation circuits, such as direct-current-direct-current (DC-DC) converters, to generate the multiple reference voltages, the multi-voltage PMIC is configured to share a single voltage-current modulation circuit among the multiple voltage modulation circuits. As such, the multi-voltage PMIC can concurrently support multiple load circuits (e.g., power amplifier circuits) with a significantly reduced footprint.

In one aspect, a multi-voltage PMIC is provided. The multi-voltage PMIC includes multiple voltage modulation circuits. Each of the multiple voltage modulation circuits is configured to generate a respective one of multiple modulated voltages based on a battery voltage, a respective one of multiple reference voltages, and a respective one of multiple reference currents. The multi-voltage PMIC also includes a control circuit. The control circuit is configured to determine a respective one of multiple non-overlapping charge intervals in each of multiple voltage modulation periods for each of the multiple voltage modulation circuits. The control circuit is also configured to cause each of the multiple voltage modulation circuits to receive the respective one of the multiple reference voltages and the respective one of the multiple reference currents during the respective one of the multiple non-overlapping charge intervals. The control circuit is also configured to prevent each of the multiple voltage modulation circuits from receiving the respective one of the multiple reference voltages and the respective one of the multiple reference currents outside the respective one of the multiple non-overlapping charge intervals.

In another aspect, a wireless device is provided. The wireless device includes a multi-voltage PMIC. The multi-voltage PMIC includes multiple voltage modulation circuits. Each of the multiple voltage modulation circuits is configured to generate a respective one of multiple modulated voltages based on a battery voltage, a respective one of multiple reference voltages, and a respective one of multiple reference currents. The multi-voltage PMIC also includes a control circuit. The control circuit is configured to determine a respective one of multiple non-overlapping charge intervals in each of multiple voltage modulation periods for each of the multiple voltage modulation circuits. The control circuit is also configured to cause each of the multiple voltage modulation circuits to receive the respective one of the multiple reference voltages and the respective one of the multiple reference currents during the respective one of the multiple non-overlapping charge intervals. The control circuit is also configured to prevent each of the multiple voltage modulation circuits from receiving the respective one of the multiple reference voltages and the respective one of the multiple reference currents outside the respective one of the multiple non-overlapping charge intervals.

In another aspect, a method for concurrently generating multiple modulated voltages in a multi-voltage PMIC is provided. The method includes configuring each of multiple voltage modulation circuits to generate a respective one of multiple modulated voltages based on a battery voltage, a respective one of multiple reference voltages, and a respective one of multiple reference currents. The method also includes determining a respective one of multiple non-overlapping charge intervals in each of multiple voltage modulation periods for each of the multiple voltage modulation circuits. The method also includes causing each of the multiple voltage modulation circuits to receive the respective one of the multiple reference voltages and the respective one of the multiple reference currents during the respective one of the multiple non-overlapping charge intervals. The method also includes preventing each of the multiple voltage modulation circuits from receiving the respective one of the multiple reference voltages and the respective one of the multiple reference currents outside the respective one of the multiple non-overlapping charge intervals.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 7 is a flowchart of an exemplary process whereby the multi-voltage PMIC of FIG. 1 can concurrently generate the multiple modulated voltages.

DETAILED DESCRIPTION

Figure 1:
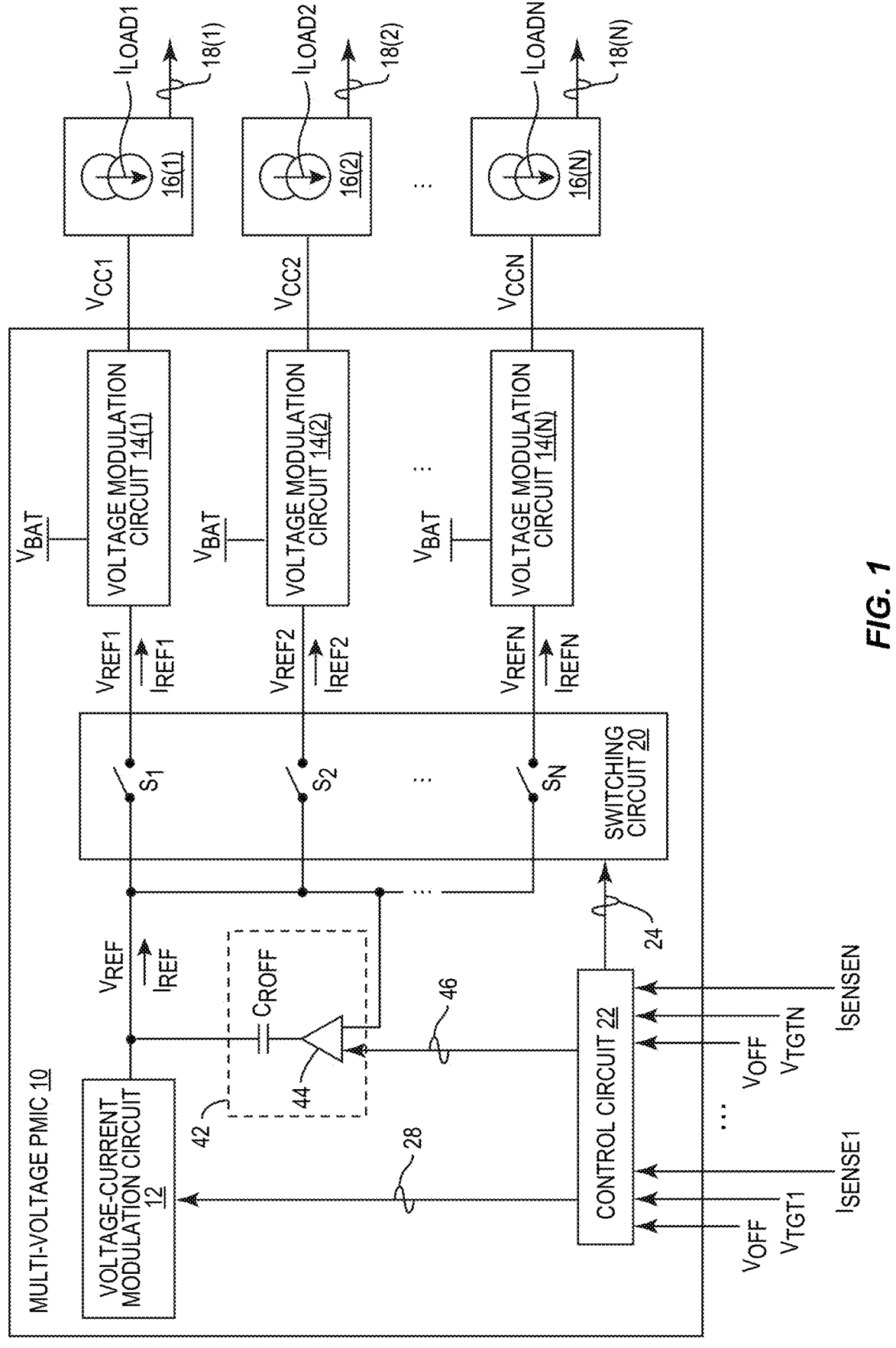
FIG. 1 is a schematic diagram of an exemplary multi-voltage power management integrated circuit (PMIC) configured to concurrently generate multiple modulated voltages by sharing a voltage-current modulation circuit.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to a multi-voltage power management integrated circuit (PMIC). More specifically, the multi-voltage generation circuit includes multiple voltage modulation circuits each configured to generate and maintain a respective one of multiple modulated voltages based on a battery voltage and a respective one of multiple reference voltages. Contrary to using multiple voltage-current modulation circuits, such as direct-current-direct-current (DC-DC) converters, to generate the multiple reference voltages, the multi-voltage PMIC is configured to share a single voltage-current modulation circuit among the multiple voltage modulation circuits. As such, the multi-voltage PMIC can concurrently support multiple load circuits (e.g., power amplifier circuits) with a significantly reduced footprint.

In this regard, FIG. 1 is a schematic diagram of an exemplary multi-voltage PMIC 10 configured to concurrently generate multiple modulated voltages $V_{CC1}$-$V_{CCN}$ by sharing a voltage-current modulation circuit 12. The multi-voltage PMIC 10 includes multiple voltage modulation circuits 14(1)-14(N) that are configured to concurrently generate the multiple modulated voltages $V_{CC1}$-$V_{CCN}$ by sharing the voltage-current modulation circuit 12. By sharing the voltage-current modulation circuit 12 among the voltage modulation circuits 14(1)-14(N), the multi-voltage PMIC 10 can be implemented with a significantly reduced footprint.

Each of the voltage modulation circuits 14(1)-14(N) is coupled to a respective one of multiple load circuits 16(1)-16(N) and configured to generate a respective one of the modulated voltages $V_{CC1}$-$V_{CCN}$. In a non-limiting example, each of the load circuits 16(1)-16(N) can be a power amplifier that amplifies a respective one of multiple signals 18(1)-18(N) to a respective output power that is a function of a respective one of multiple load currents $I_{LOAD1}$-$I_{LOADN}$ and a respective one of the modulated voltages $V_{CC1}$-$V_{CCN}$. As described in detail below, the multi-voltage PMIC 10 can make the modulated voltages $V_{CC1}$-$V_{CCN}$ and the load currents $I_{LOAD1}$-$I_{LOADN}$ concurrently available to the load circuits 16(1)-16(N) to thereby enable concurrent operations (e.g., signal amplification) of the load circuits 16(1)-16(N).

According to an embodiment of the present disclosure, each of the voltage modulation circuits 14(1)-14(N) is configured to generate a respective one of the modulated voltages $V_{CC1}$-$V_{CCN}$ as a function of a battery voltage $V_{BAT}$ and a respective one of multiple reference voltages $V_{REF1}$-$V_{REFN}$. In a non-limiting example, a modulated voltage $V_{CCi}$ ($1 \le i \le N$) among the modulated voltages $V_{CC1}$-$V_{CCN}$ can be expressed in equation (Eq. 1) below.

$$V_{CCi} = (\alpha_i + x_i) * V_{REFi} + \beta_i * V_{BAT} \quad (1 \le i \le N) \qquad \text{(Eq. 1)}$$

In the equation (Eq. 1), $(\alpha_i+x_i)$ and $\beta_i$ represent switch ratios (e.g., ¼, ½, 1, 1¼, 1½, 2, etc.), which will be further discussed in FIGS. 5A-5D, and $V_{REFi}$ represents a respective one of the reference voltages $V_{REF1}$-$V_{REFN}$. Notably, by generating each of the modulated voltages $V_{CC1}$-$V_{CCN}$ based on both the battery voltage $V_{BAT}$ and the respective one of the reference voltages $V_{REF1}$-$V_{REFN}$, it is possible to more flexibly adapt the modulated voltages $V_{CC1}$-$V_{CCN}$ to better track amplitude variations of the signals 18(1)-18(N) and, therefore, improve efficiencies of the load circuits 16(1)-16(N). Moreover, by generating the modulated voltages $V_{CC1}$-$V_{CCN}$ based on both the battery voltage $V_{BAT}$ and the reference voltages $V_{REF1}$-$V_{REFN}$, it is possible to generate the modulated voltages $V_{CC1}$-$V_{CCN}$ with reduced reliance on any single voltage source. For example, when the battery voltage $V_{BAT}$ becomes low, the reference voltages $V_{REF1}$-$V_{REFN}$ can be ramped up to make up the deficit of the battery voltage $V_{BAT}$, and vice versa.

The voltage-current modulation circuit 12 is configured to generate a reference voltage $V_{REF}$ and a reference current $I_{REF}$. Since the voltage-current modulation circuit 12 is shared among the voltage modulation circuits 14(1)-14 (N), the reference voltage $V_{REF}$ and the reference current $I_{REF}$ are likewise shared among the voltage modulation circuits 14(1)-14(N). In an embodiment, the multi-voltage PMIC 10 includes a switching circuit 20 that is coupled between the voltage-current modulation circuit 12 and each of the voltage modulation circuits 14(1)-14(N). In a non-limiting example, the switching circuit 20 includes multiple switches $S_1$-$S_N$, each of which is provided between the voltage-current modulation circuit 12 and a respective one of the voltage modulation circuits 14(1)-14(N). Notably, when any of the switches $S_1$-$S_N$ is closed, the voltage-current modulation circuit 12 will be coupled to a respective one of the voltage modulation circuits 14(1)-14(N). As a result, the reference voltage $V_{REF}$ will be provided to the respective one of the voltage modulation circuits 14(1)-14(N) as the respective one of the reference voltages $V_{REF1}$-$V_{REFN}$, and the reference current $I_{REF}$ will be provided to the respective one of the voltage modulation circuits 14(1)-14(N) as a respective one of multiple reference currents $I_{REF1}$-$I_{REFN}$.

Given that the voltage-current modulation circuit 12 is shared among the voltage modulation circuits 14(1)-14(N), only one of the switches $S_1$-$S_N$ can be closed at any given time. As an example, when switch $S_1$ is closed, switches $S_2$-$S_N$ must be opened. In this regard, as illustrated in FIG. 2, the multi-voltage PMIC 10 is configured to alternately couple the voltage-current modulation circuit 12 to the voltage modulation circuits 14(1)-14(N) based on a multi-plexing (a.k.a. time-division) scheme.

Figure 2:
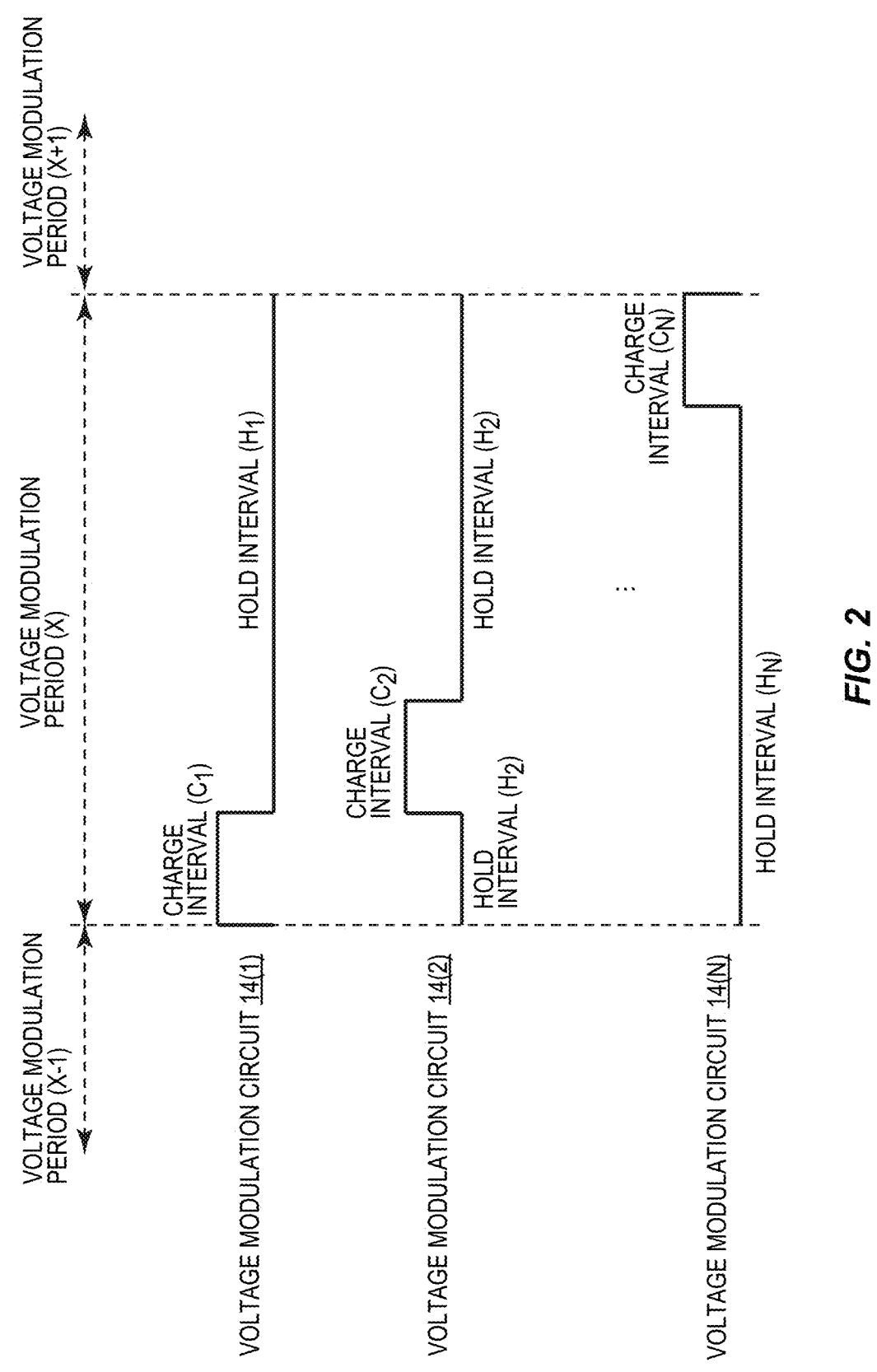
FIG. 2 is a schematic diagram providing an exemplary illustration of the multiplexing scheme that enables the multi-voltage PMIC of FIG. 1 to currently generate the multiple modulated voltages by sharing the voltage-current modulation circuit.

FIG. 2 is a schematic diagram providing an exemplary illustration of the multiplexing scheme that enables the multi-voltage PMIC 10 of FIG. 1 to currently generate the modulated voltages $V_{CC1}$-$V_{CCN}$ by sharing the voltage-current modulation circuit 12. Common elements between FIGS. 1 and 2 are shown therein with common element numbers and will not be re-described herein.

Herein, the multi-voltage PMIC 10 is configured to make the modulated voltages $V_{CC1}$-$V_{CCN}$ concurrently available in each of multiple voltage modulation periods X−1, X, X+1. Notably, the voltage modulation periods X−1, X, X+1 are merely examples for the purpose of illustration and shall not be interpreted as limiting. Among them, the voltage modulation period X is described herein as a non-limiting example.

Specifically, the voltage modulation period X is divided into multiple charge intervals $C_1$-$C_N$ and multiple hold intervals $H_1$-$H_N$. Each of the voltage modulation circuits 14(1)-14(N) is assigned a respective one of the charge intervals $C_1$-$C_N$ and a respective one of the hold intervals $H_1$-$H_N$. During each of the charge intervals $C_1$-$C_N$, a respective one of the switches $S_1$-$S_N$ is closed to couple the voltage-current modulation circuit 12 to a respective one of the voltage modulation circuits 14(1)-14(N). Thus, to ensure that only one of the voltage modulation circuits 14(1)-14(N) is coupled to the voltage-current modulation circuit 12 at any given time, the charge intervals $C_1$-$C_N$ are so determined to be non-overlapping with each other. Accordingly, the hold intervals $H_1$-$H_N$ are also non-overlapping with each other.

During each of the charge intervals $C_1$-$C_N$, a respective one of the voltage modulation circuits 14(1)-14(N) is configured to generate the respective one of the modulated voltages $V_{CC1}$-$V_{CCN}$ based on the battery voltage $V_{BAT}$ and the respective one of the reference voltages $V_{REF1}$-$V_{REFN}$. During each of the hold intervals $H_1$-$H_N$, on the other hand, a respective one of the voltage modulation circuits 14(1)-14(N) is configured to maintain the respective one of the modulated voltages $V_{CC1}$-$V_{CCN}$ until a respective one of the charge intervals $C_1$-$C_N$ in the next voltage modulation period (e.g., the voltage modulation period X+1). Such generating and holding operations performed by each of the voltage modulation circuits 14(1)-14(N) make it possible for the multi-voltage PMIC 10 to concurrently supply the modulated voltages $V_{CC1}$-$V_{CCN}$ to the load circuits 16(1)-16(N) during each of the voltage modulation periods X−1, X, X+1.

With reference back to FIG. 1, the multi-voltage PMIC 10 includes a control circuit 22, which can be a field-programmable gate array (FPGA) or an application-specific integrated circuit (ASIC), as an example. The control circuit 22 is configured to determine the voltage modulation periods X−1, X, X+1 as well as the charge intervals $C_1$-$C_N$ and the hold intervals $H_1$-$H_N$ in each of the voltage modulation periods X−1, X, X+1. In an embodiment, the control circuit 22 can control the switching circuit 20 (e.g., via a switching signal 24) to close the switches $S_1$-$S_N$ in the charge intervals $C_1$-$C_N$ and open the switches $S_1$-$S_N$ in the hold intervals $H_1$-$H_N$, respectively.

Figure 3:
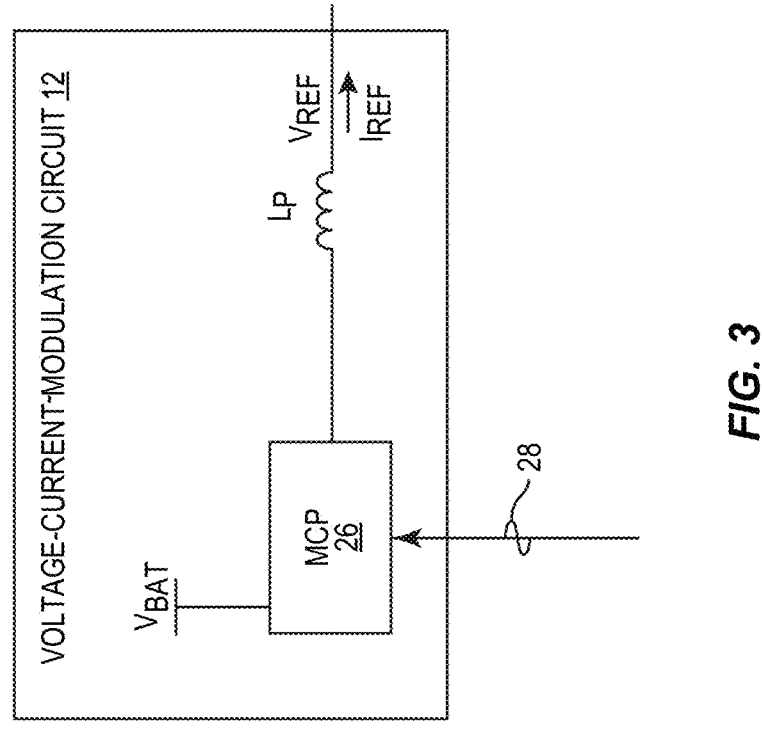
FIG. 3 is a schematic diagram illustrating the voltage-current modulation circuit in FIG. 1.

In an embodiment, the voltage-current modulation circuit 12 can be implemented by a direct-current-direct-current (DC-DC) converter. FIG. 3 is a schematic diagram providing an exemplary illustration of the voltage-current modulation circuit 12 in FIG. 1. Common elements between FIGS. 1 and 3 are shown therein with common element numbers and will not be re-described herein.

Herein, the voltage-current modulation circuit 12 includes a multi-level charge pump (MCP) 26 and a power inductor $L_P$. In a non-limiting example, the MCP 26 can be a buck-boost DC-DC voltage converter that operates in a buck mode and/or a boost mode to modulate the reference voltage $V_{REF}$. Herein, the MCP 26 may be configured to generate the reference voltage $V_{REF}$ as a function of the battery voltage $V_{BAT}$. Specifically, the MCP 26 may operate in the buck mode to generate the reference voltage $V_{REF}$ at $0 \times V_{BAT}$ ($0$ V) or $1 \times V_{BAT}$ Or operate in the boost mode to generate the reference voltage $V_{REF}$ at $2 \times V_{BAT}$. In an embodiment, the MCP 26 may alternate between the buck mode and the boost mode in accordance with a duty cycle signal 28. As an example, the duty cycle signal 28 can be so determined to cause the MCP 26 to alternate between generating the reference voltage $V_{REF}$ between $0$ V, $V_{BAT}$, and $2V_{BAT}$ based on a 30-30-40 ratio (30%@0 V, 30%@$V_{BAT}$, 40% @$2V_{BAT}$). As such, it is possible to adjust the reference voltage $V_{REF}$ by adjusting the duty cycle signal 28.

The power inductor $L_P$ is configured to induce the reference current $I_{REF}$ based on the reference voltage $V_{REF}$. Like the reference voltage $V_{REF}$, the reference current $I_{REF}$ can also be adjusted based on the duty cycle signal 28. Notably, the power inductor $L_P$ can have a relatively large inductance that can limit the ability of the voltage-current modulation circuit 12 to change the reference voltage $V_{REF}$ and/or the reference current $I_{REF}$ in a timely manner. In this regard, by configuring each of the voltage modulation circuits 14(1)-14(N) to further generate the respective one of the modulated voltages $V_{CC1}$-$V_{CCN}$ based on the battery voltage $V_{BAT}$, it is possible to ramp up or down the modulated voltages $V_{CC1}$-$V_{CCN}$ more quickly than the voltage-current modulation circuit 12 can do alone.

Figure 4:
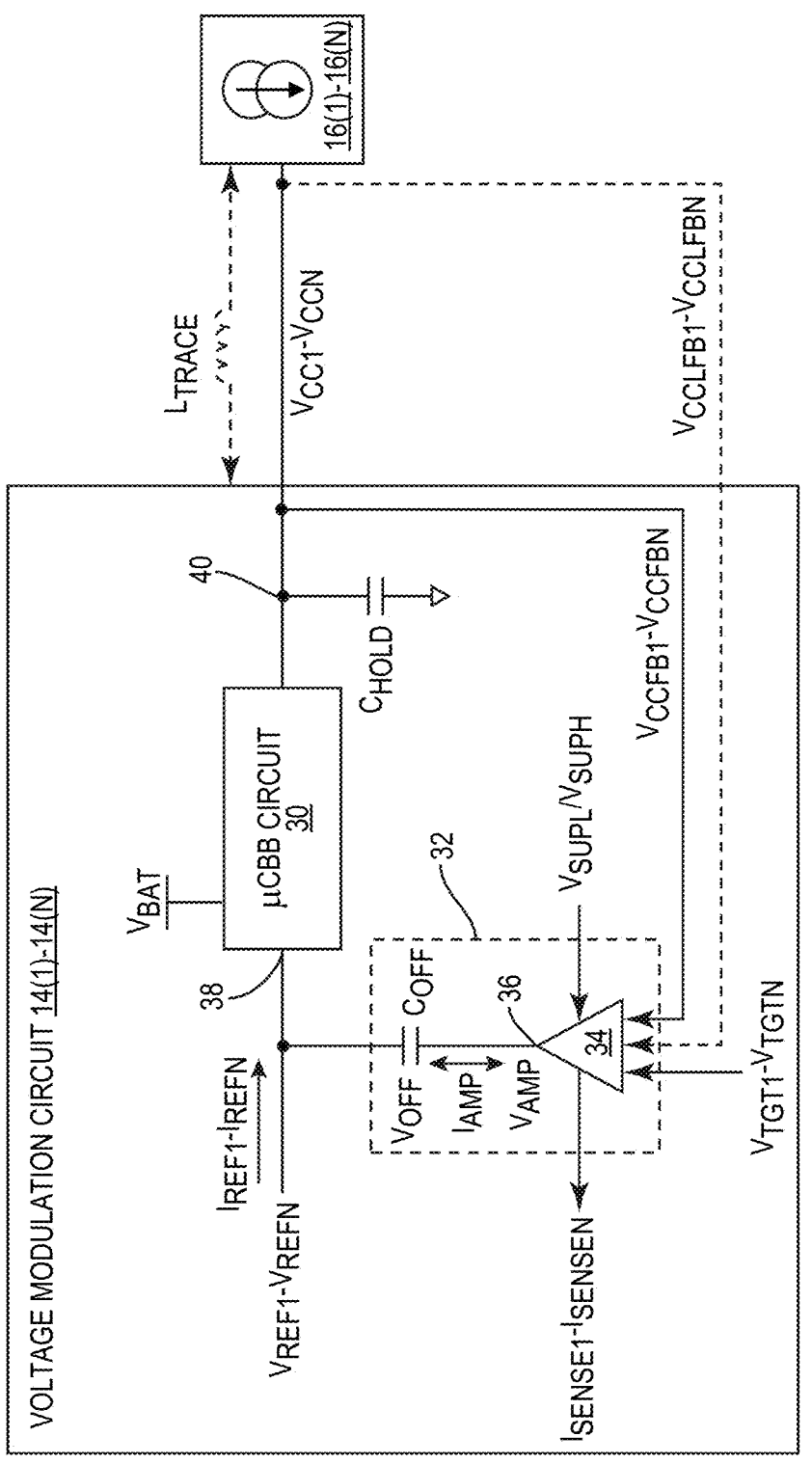
FIG. 4 is a schematic diagram of an exemplary voltage modulation circuit that can be provided in the multi-voltage PMIC of FIG. 1 for generating any of the modulated voltages.

FIG. 4 is a schematic diagram providing an exemplary illustration of each of the voltage modulation circuits 14(1)-14(N) in the multi-voltage PMIC 10 of FIG. 1. Common elements between FIGS. 1 and 4 are shown therein with common element numbers and will not be re-described herein.

In an embodiment, each of the voltage modulation circuits 14(1)-14(N) includes a micro capacitor-based buck-boost (μCBB) circuit 30, a voltage regulation circuit 32, and a holding capacitor $C_{HOLD}$. The μCBB circuit 30 is configured to generate the respective one of the modulated voltages $V_{CC1}$-$V_{CCN}$ based on the battery voltage $V_{BAT}$ and the respective one of the reference voltages $V_{REF1}$-$V_{REFN}$ during the respective one of the charge intervals $C_1$-$C_N$. The holding capacitor $C_{HOLD}$ is charged by the respective one of the reference currents $I_{REF1}$-$I_{REFN}$ during the respective one of the charge intervals $C_1$-$C_N$ and discharged during the respective one of the hold intervals $H_1$-$H_N$ to maintain the respective one of the modulated voltages $V_{CC1}$-$V_{CCN}$.

In some embodiments, the holding capacitor $C_{HOLD}$ may be of equal capacitance among the voltage modulation circuits 14(1)-14(N). In this regard, if the load circuits 16(1)-16(N) have an equal load impedance, the charge intervals $C_1$-$C_N$ may be configured to have equal lengths. Otherwise, the charge intervals $C_1$-$C_N$ may be configured to have unequal lengths.

The μCBB circuit 30 may be configured according to various embodiments to generate the respective one of the modulated voltages $V_{CC1}$-$V_{CCN}$ as a function of the battery voltage $V_{BAT}$ and the respective one of the reference voltages $V_{REF1}$-$V_{REFN}$. In this regard, FIGS. 5A-5D are schematic diagrams illustrating various embodiments for generating the modulated voltages $V_{CC1}$-$V_{CCN}$ in FIG. 1 as a function of the battery voltage $V_{BAT}$ and the respective one of the reference voltages $V_{REF1}$-$V_{REFN}$. Common elements between FIGS. 1, 4, and 5A-5D are shown therein with common element numbers and will not be re-described herein.

Figure 5A:
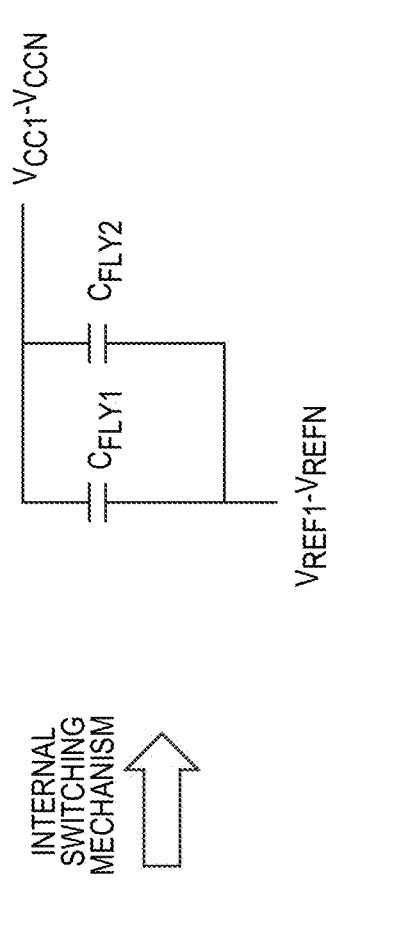
FIGS. 5A-5D are schematic diagrams illustrating various embodiments for generating each of the modulated voltages in FIG. 1 as a function of a battery voltage and a respective reference voltage.
Figure 5A:
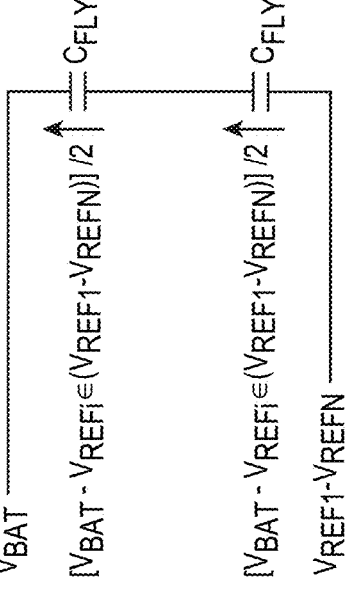

With reference to FIG. 5A, the μCBB circuit 30 may include a first fly capacitor $C_{FLY1}$ and a second fly capacitor $C_{FLY2}$ coupled in series, as shown on the left. The μCBB circuit 30 may further include one or more internal switches (not shown) that can be opened and/or closed to collectively provide an internal switching mechanism that transforms the battery voltage $V_{BAT}$ and a respective one of the modulated voltages $V_{CC1}$-$V_{CCN}$, as shown on the right.

Figure 5B:
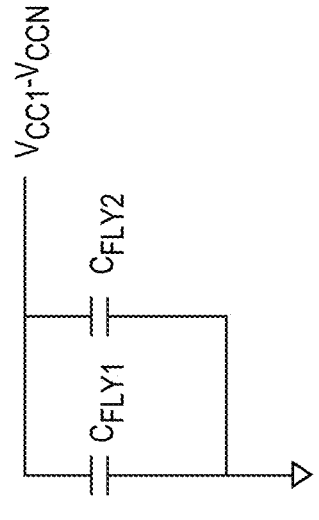
Figure 5B:
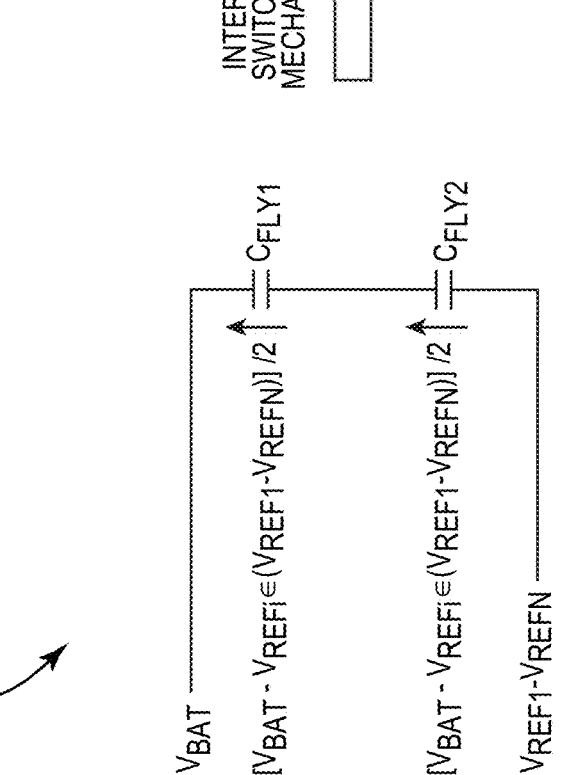

With reference to FIG. 5B, the μCBB circuit 30 may include a first fly capacitor $C_{FLY1}$ and a second fly capacitor $C_{FLY2}$ coupled in series, as shown on the left. The μCBB circuit 30 may further include one or more internal switches (not shown) that can be opened and/or closed to collectively provide an internal switching mechanism that transforms the battery voltage $V_{BAT}$ and a respective one of the modulated voltages $V_{CC1}$-$V_{CCN}$, as shown on the right.

Figure 5C:
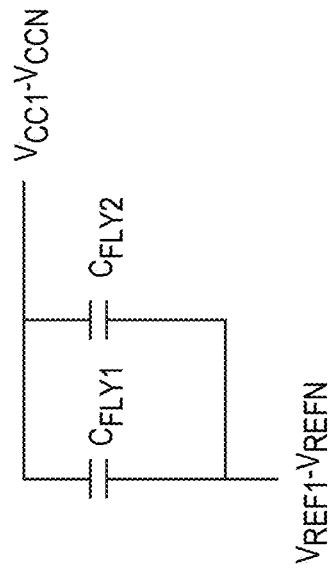
Figure 5C:
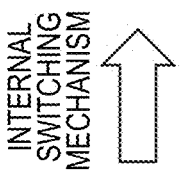
Figure 5C:
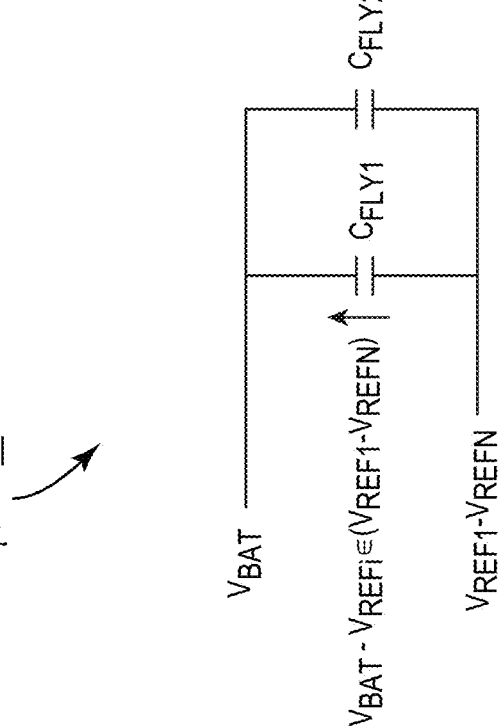

With reference to FIG. 5C, the μCBB circuit 30 may include a first fly capacitor $C_{FLY1}$ and a second fly capacitor $C_{FLY2}$ coupled in parallel, as shown on the left. The μCBB circuit 30 may further include one or more internal switches (not shown) that can be opened and/or closed to collectively provide an internal switching mechanism that transforms the battery voltage $V_{BAT}$ and a respective one of the modulated voltages $V_{CC1}$-$V_{CCN}$, as shown on the right.

Figure 5D:
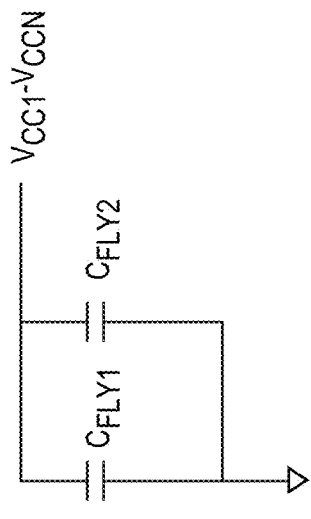
Figure 5D:
Figure 5D:
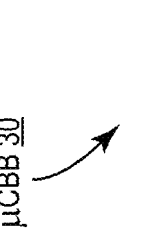
Figure 5D:
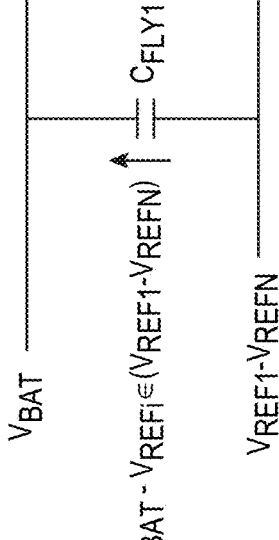

With reference to FIG. 5D, the μCBB circuit 30 may include a first fly capacitor $C_{FLY1}$ and a second fly capacitor $C_{FLY2}$ coupled in parallel, as shown on the left. The μCBB circuit 30 may further include one or more internal switches (not shown) that can be opened and/or closed to collectively provide an internal switching mechanism that transforms the battery voltage $V_{BAT}$ and a respective one of the modulated voltages $V_{CC1}$-$V_{CCN}$, as shown on the right.

With reference back to FIG. 4, the voltage regulation circuit 32 includes a voltage amplifier 34 coupled in series with an offset capacitor $C_{OFF}$. The voltage amplifier 34 is configured to generate a modulated initial voltage $V_{AMP}$ based on a respective one of multiple modulated target voltages $V_{TGT1}$-$V_{TGTN}$ each generated to track a respective time-variant amplitude of the signals 18(1)-18(N). The voltage amplifier 34 may be biased by one of multiple supply voltages $V_{SUPL}$, $V_{SUPH}$ ($V_{SUPL}$<$V_{SUPH}$). For example, the voltage amplifier 34 may be biased by the supply voltage $V_{SUPL}$ when a respective one of the modulated target voltages $V_{TGT1}$-$V_{TGTN}$ is below a threshold or be biased by the supply voltage $V_{SUPH}$ when the respective one of the modulated target voltages $V_{TGT1}$-$V_{TGTN}$ is above the threshold. By adapting the supply voltage $V_{SUPL}$, $V_{SUPH}$ based on the modulated target voltages $V_{TGT1}$-$V_{TGTN}$, the voltage amplifier 34 can maintain an optimal operating efficiency.

The offset capacitor $C_{OFF}$ is coupled between an output 36 of the voltage amplifier 34 and an input 38 of the μCBB circuit 30. The offset capacitor $C_{OFF}$ may be charged or discharged to provide an offset voltage $V_{OFF}$ between the output 36 of the voltage amplifier 34 and the input of the μCBB circuit 30. In a non-limiting example, the offset capacitor $C_{OFF}$ may be charged by a current LAMP sourced by the voltage amplifier 34 or discharged by the current $I_{AMP}$ sunk into the voltage amplifier 34 to thereby change the offset voltage $V_{OFF}$. As a result, the voltage regulation circuit 32 can regulate a respective one of the reference voltages $V_{REF1}$-$V_{REFN}$ at the input 38 of the μCBB circuit 30 by adapting the modulated initial voltage $V_{AMP}$ and/or the offset voltage $V_{OFF}$ based on a respective one of the modulated target voltage $V_{TGT1}$-$V_{TGTN}$.

In an embodiment, the voltage amplifier 34 may receive a respective one of multiple first feedback voltages $V_{CCFB1}$-$V_{CCFBN}$ each indicating a respective one of the modulated voltages $V_{CC1}$-$V_{CCN}$ at a holding node 40. Accordingly, the voltage amplifier 34 can compare a respective one of the first feedback voltages $V_{CCFB1}$-$V_{CCFBN}$ against a respective one of the modulated target voltages $V_{TGT1}$-$V_{TGTN}$ to determine whether to increase or decrease the respective one of the reference voltages $V_{REF1}$-$V_{REFN}$. Should the voltage amplifier 34 determine that the respective one of the first feedback voltages $V_{CCFB1}$-$V_{CCFBN}$ is lower than the respective one of the modulated target voltages $V_{TGT1}$-$V_{TGTN}$, the voltage amplifier 34 may ramp up the modulated initial voltage $V_{AMP}$ and/or source the current $I_{AMP}$ to charge up the offset capacitor $C_{OFF}$ to thereby increase the respective one of the reference voltages $V_{REF1}$-$V_{REFN}$. In contrast, if the voltage amplifier 34 determines that the respective one of the first feedback voltages $V_{CCFB1}$-$V_{CCFBN}$ is higher than the respective one of the modulated target voltages $V_{TGT1}$-$V_{TGTN}$, the voltage amplifier 34 may reduce the modulated initial voltage $V_{AMP}$ and/or sink the current LAMP to discharge the offset capacitor $C_{OFF}$ to thereby decrease the respective one of the reference voltages $V_{REF1}$-$V_{REFN}$. In an embodiment, the voltage amplifier 34 may generate a respective one of multiple sense currents $I_{SENSE1}$-$I_{SENSEN}$ to indicate an amount of the current LAMP sourced/sunk in accordance with the respective one of the first feedback voltages $V_{CCFB1}$-$V_{CCFBN}$.

In some embodiments, each of the voltage modulation circuits 14(1)-14(N) may be coupled to a respective one of the load circuits 16(1)-16(N) via some kind of conductive trace that is inherently associated with a trace inductance $L_{TRACE}$. This trace induction may cause a distortion in the modulated voltages $V_{CC1}$-$V_{CCN}$ as received at the load circuits 16(1)-16(N). In this regard, the voltage amplifier 34 may be further configured to receive a respective one of multiple second feedback voltages $V_{CCLFB1}$-$V_{CCLFBN}$ each indicating a respective one of the modulated voltages $V_{CC1}$-$V_{CCN}$ received at a respective one of the load circuits 16(1)-16(N). Accordingly, the voltage amplifier 34 can further determine whether to increase or decrease the respective one of the reference voltages $V_{REF1}$-$V_{REFN}$ by taking into account the voltage distortion resulted from the trace inductance $L_{TRACE}$.

With reference back to FIG. 1, the control circuit 22 may be configured to determine the duty cycle signal 28 based on a range of factors. In an embodiment, the control circuit 22 may determine the duty cycle signal 28 for generating each of the reference voltages $V_{REF1}$-$V_{REFN}$ based on a respective one of the modulated target voltages $V_{TGT1}$-$V_{TGTN}$, a respective one of the sense currents $I_{SENSE1}$-$I_{SENSEN}$, and/or the offset voltage $V_{OFF}$ associated with each of the reference voltages $V_{REF1}$-$V_{REFN}$.

Notably, when any of the switches $S_1$-$S_N$ in the switching circuit 20 is opened or closed, the presence of the reference current $I_{REF}$ may cause a flyback voltage than can potentially damage the switches $S_1$-$S_N$. As such, it is desirable to protect the switches $S_1$-$S_N$ from such hot switching.

In this regard, the multi-voltage PMIC 10 may be further configured to include a switch protection circuit 42, which is coupled between the voltage-current modulation circuit 12 and each of the switches $S_1$-$S_N$. In an embodiment, the switch protection circuit 42 can include a switch protection voltage amplifier 44 coupled in series with a switch protection offset capacitor $C_{ROFF}$. The switch protection circuit 42 may be controlled (e.g., enabled and disabled) by the control circuit 22 via a control signal 46. When enabled, the switch protection circuit 42 may charge or discharge the switch protection offset capacitor $C_{ROFF}$ to thereby adjust the reference voltage $V_{REF}$. In a non-limiting example, the switch protection circuit 42 can adjust the reference voltage $V_{REF}$ to momentarily block the reference current $I_{REF}$ when opening and closing any of the switches $S_1$-$S_N$, thus helping to prevent hot switching damage to any of the switches $S_1$-$S_N$.

Figure 6:
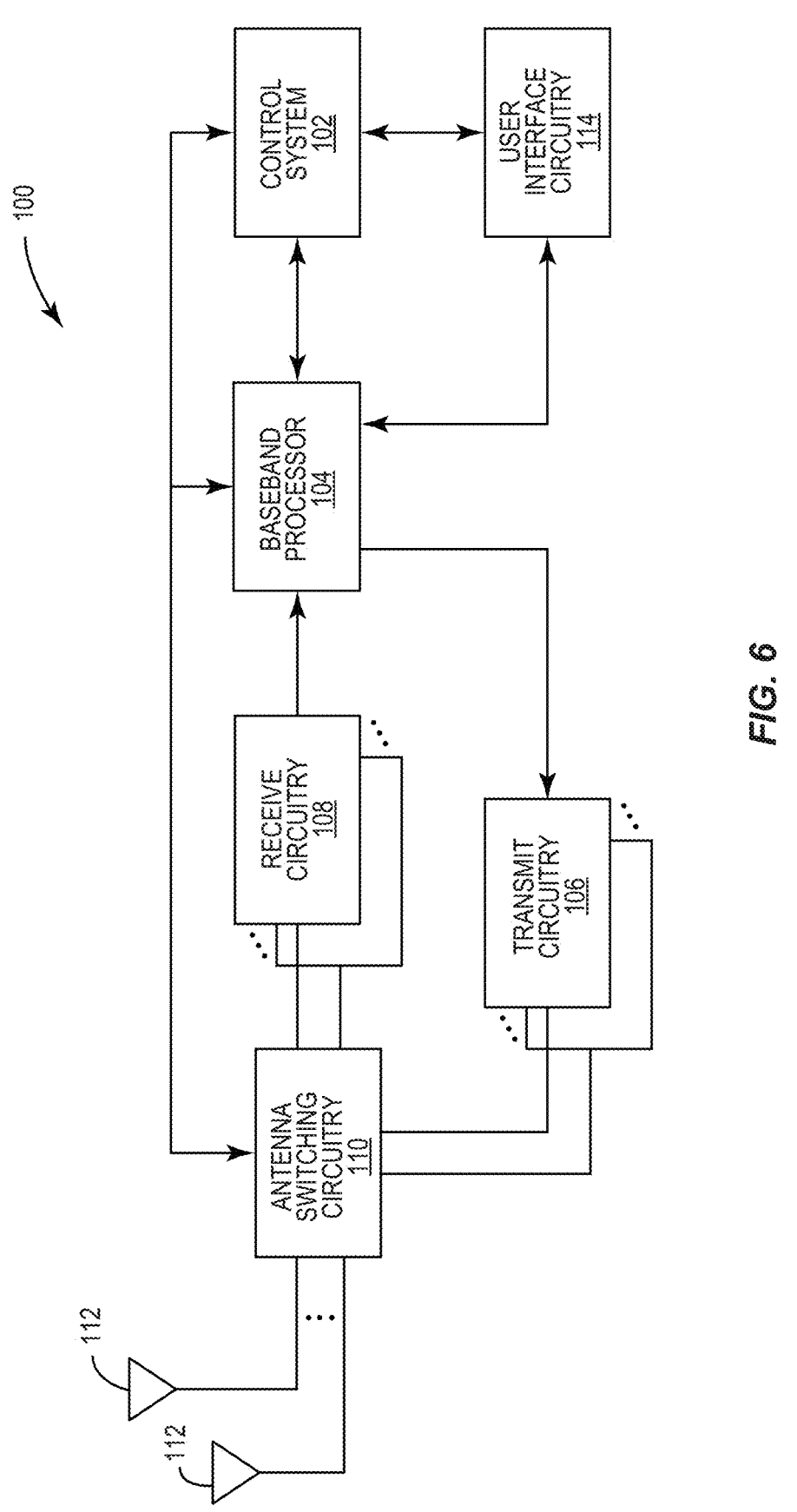
FIG. 6 is a schematic diagram of an exemplary user element wherein the multi-voltage PMIC of FIG. 1 can be provided.

The multi-voltage PMIC 10 of FIG. 1 can be provided in a user element to enable the embodiments described above. In this regard, FIG. 6 is a schematic diagram of an exemplary user element 100 wherein the multi-voltage PMIC 10 of FIG. 1 can be provided.

Herein, the user element 100 can be any type of user element, such as a mobile terminal, smart watch, tablet, computer, navigation device, access point, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using an analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

In an embodiment, the multi-voltage PMIC 10 of FIG. 1 can be configured to concurrently generate the modulated voltage $V_{CC1}$-$V_{CCN}$ in accordance with a process. In this regard, FIG. 7 is a flowchart of an exemplary process 200 whereby the multi-voltage PMIC 10 of FIG. 1 can concurrently generate the modulated voltage $V_{CC1}$-$V_{CCN}$.

Herein, the process 200 includes configuring each of the voltage modulation circuits 14(1)-14(N) to generate a respective one of the modulated voltages $V_{CC1}$-$V_{CCN}$ based on the battery voltage $V_{BAT}$, a respective one of the reference voltages $V_{REF1}$-$V_{REFN}$, and a respective one of the reference currents $I_{REF1}$-$I_{REFN}$ (step 202). The process 200 also includes determining a respective one of the non-overlapping charge intervals $C_1$-$C_N$ in each of the voltage modulation periods X−1, X, X+1 for each of the voltage modulation circuits 14(1)-14(N) (step 204). The process 200 also includes causing each of the voltage modulation circuits 14(1)-14(N) to receive the respective one of the reference voltages $V_{REF1}$-$V_{REFN}$ and the respective one of the reference currents $I_{REF1}$-$I_{REFN}$ during the respective one of the non-overlapping charge intervals $C_1$-$C_N$ (step 206). The process 200 also includes preventing each of the voltage modulation circuits 14(1)-14(N) from receiving the respective one of the reference voltages $V_{REF1}$-$V_{REFN}$ and the respective one of the currents $I_{REF1}$-$I_{REFN}$ outside the respective one of the non-overlapping charge intervals $C_1$-$C_N$ (step 208).

Those skilled in the art will recognize improvements and modifications to the preferred embodiments of the present disclosure. All such improvements and modifications are considered within the scope of the concepts disclosed herein and the claims that follow.

What is claimed is:

1. A multi-voltage power management integrated circuit (PMIC) comprising:
   a plurality of voltage modulation circuits each configured to generate a respective one of a plurality of modulated voltages based on a battery voltage, a respective one of a plurality of reference voltages, and a respective one of a plurality of reference currents; and
   a control circuit configured to:
      determine a respective one of a plurality of non-overlapping charge intervals in each of a plurality of voltage modulation periods for each of the plurality of voltage modulation circuits;
      cause each of the plurality of voltage modulation circuits to receive the respective one of the plurality of reference voltages and the respective one of the plurality of reference currents during the respective one of the plurality of non-overlapping charge intervals; and
      prevent each of the plurality of voltage modulation circuits from receiving the respective one of the plurality of reference voltages and the respective one of the plurality of reference currents outside the respective one of the plurality of non-overlapping charge intervals.

2. The multi-voltage PMIC of claim 1, wherein the control circuit is further configured to:

determine a respective one of a plurality of non-overlapping hold intervals in each of the plurality of voltage modulation periods for each of the plurality of voltage modulation circuits; and
   prevent each of the plurality of voltage modulation circuits from receiving the respective one of the plurality of reference voltages during the respective one of the plurality of non-overlapping hold intervals.

3. The multi-voltage PMIC of claim 2, wherein each of the plurality of non-overlapping charge intervals is of an equal length.

4. The multi-voltage PMIC of claim 2, wherein each of the plurality of non-overlapping charge intervals is of an unequal length.

5. The multi-voltage PMIC of claim 1, further comprising:
   a voltage-current modulation circuit configured to generate a reference voltage and a reference current based on the battery voltage; and
   a switching circuit coupled between the voltage-current modulation circuit and the plurality of voltage modulation circuits;
   wherein the control circuit is further configured to:
      control the switching circuit to couple the voltage-current modulation circuit to each of the plurality of voltage modulation circuits during the respective one of the plurality of non-overlapping charge intervals to thereby provide the reference voltage to the respective one of the plurality of voltage modulation circuits as the respective one of the plurality of reference voltages and provide the reference current to the respective one of the plurality of voltage modulation circuits as the respective one of the plurality of reference currents; and
      control the switching circuit to decouple the voltage-current modulation circuit from each of the plurality of voltage modulation circuits outside the respective one of the plurality of non-overlapping charge intervals.

6. The multi-voltage PMIC of claim 5, wherein:
   the switching circuit comprises a plurality of switches each coupled between the voltage-current modulation circuit and a respective one of the plurality of voltage modulation circuits; and
   the control circuit is further configured to:
      close a respective one of the plurality of switches to thereby couple the voltage-current modulation circuit to the respective one of the plurality of voltage modulation circuits; and
      open the respective one of the plurality of switches to thereby decouple the voltage-current modulation circuit from the respective one of the plurality of voltage modulation circuits.

7. The multi-voltage PMIC of claim 6, further comprising a switch protection circuit coupled between the voltage-current modulation circuit and each of the plurality of switches, the switch protection circuit is configured to adjust the reference voltage to thereby prevent hot switching when opening and closing any of the plurality of switches.

8. The multi-voltage PMIC of claim 1, wherein each of the plurality of voltage modulation circuits comprises:
   a micro capacitor-based buck-boost (μCBB) circuit configured to generate the respective one of the plurality of modulated voltages based on the battery voltage and the respective one of the plurality of reference voltages during the respective one of the plurality of non-overlapping charge intervals;

13

14 a voltage regulation circuit configured to regulate the respective one of the plurality of reference voltages during the respective one of the plurality of non-overlapping charge intervals in each of the plurality of voltage modulation periods; and a holding capacitor configured to maintain the respective one of the plurality of modulated voltages outside the respective one of the plurality of non-overlapping charge intervals in each of the plurality of voltage modulation periods.

9. The multi-voltage PMIC of claim 8, wherein the voltage regulation circuit comprises:

a voltage amplifier configured to generate a respective modulated initial voltage in each of the plurality of voltage modulation periods based on a respective one of a plurality of modulated target voltages; and an offset capacitor coupled between an output of the voltage amplifier and an input of the μCBB circuit and configured to adjust the respective modulated initial voltage to thereby:

regulate the respective one of the plurality of reference voltages during the respective one of the plurality of non-overlapping charge intervals in each of the plurality of voltage modulation periods; and maintain the respective one of the plurality of modulated voltages outside the respective one of the plurality of non-overlapping charge intervals in each of the plurality of voltage modulation periods.

10. The multi-voltage PMIC of claim 9, wherein the voltage amplifier is further configured to generate the respective modulated initial voltage based on a first feedback voltage indicating the respective one of the plurality of modulated voltages generated by the respective one of the plurality of voltage modulation circuits.

11. The multi-voltage PMIC of claim 10, wherein the voltage amplifier is further configured to generate the respective modulated initial voltage based on a second feedback voltage indicating the respective one of the plurality of modulated voltages received by a coupled load circuit.

12. A wireless device comprising a multi-voltage power management integrated circuit (PMIC), the multi-voltage PMIC comprises:

a plurality of voltage modulation circuits each configured to generate a respective one of a plurality of modulated voltages based on a battery voltage, a respective one of a plurality of reference voltages, and a respective one of a plurality of reference currents; and a control circuit configured to:

determine a respective one of a plurality of non-overlapping charge intervals in each of a plurality of voltage modulation periods for each of the plurality of voltage modulation circuits;

cause each of the plurality of voltage modulation circuits to receive the respective one of the plurality of reference voltages and the respective one of the plurality of reference currents during the respective one of the plurality of non-overlapping charge intervals; and prevent each of the plurality of voltage modulation circuits from receiving the respective one of the plurality of reference voltages and the respective one of the plurality of reference currents outside the respective one of the plurality of non-overlapping charge intervals.

13. The wireless device of claim 12, wherein the multi-voltage PMIC further comprises:

a voltage-current modulation circuit configured to generate a reference voltage and a reference current based on the battery voltage; and a switching circuit coupled between the voltage-current modulation circuit and the plurality of voltage modulation circuits;

wherein the control circuit is further configured to:

control the switching circuit to couple the voltage-current modulation circuit to each of the plurality of voltage modulation circuits during the respective one of the plurality of non-overlapping charge intervals to thereby provide the reference voltage to the respective one of the plurality of voltage modulation circuits as the respective one of the plurality of reference voltages and provide the reference current to the respective one of the plurality of voltage modulation circuits as the respective one of the plurality of reference currents; and control the switching circuit to decouple the voltage-current modulation circuit from each of the plurality of voltage modulation circuits outside the respective one of the plurality of non-overlapping charge intervals.

14. The wireless device of claim 13, wherein:

the switching circuit comprises a plurality of switches each coupled between the voltage-current modulation circuit and a respective one of the plurality of voltage modulation circuits; and the control circuit is further configured to:

close a respective one of the plurality of switches to thereby couple the voltage-current modulation circuit to the respective one of the plurality of voltage modulation circuits; and open the respective one of the plurality of switches to thereby decouple the voltage-current modulation circuit from the respective one of the plurality of voltage modulation circuits.

15. The wireless device of claim 14, wherein the multi-voltage PMIC further comprises a switch protection circuit coupled between the voltage-current modulation circuit and each of the plurality of switches, the switch protection circuit is configured to adjust the reference voltage to thereby prevent hot switching when opening and closing any of the plurality of switches.

16. The wireless device of claim 12, wherein each of the plurality of voltage modulation circuits comprises:

a micro capacitor-based buck-boost (μCBB) circuit configured to generate the respective one of the plurality of modulated voltages based on the battery voltage and the respective one of the plurality of reference voltages during the respective one of the plurality of non-overlapping charge intervals;

a voltage regulation circuit configured to regulate the respective one of the plurality of reference voltages during the respective one of the plurality of non-overlapping charge intervals in each of the plurality of voltage modulation periods; and a holding capacitor configured to maintain the respective one of the plurality of modulated voltages outside the respective one of the plurality of non-overlapping charge intervals in each of the plurality of voltage modulation periods.

17. The wireless device of claim 16, wherein the voltage regulation circuit comprises:

a voltage amplifier configured to generate a respective modulated initial voltage in each of the plurality of voltage modulation periods based on a respective one of a plurality of modulated target voltages; and an offset capacitor coupled between an output of the voltage amplifier and an input of the μCBB circuit and configured to adjust the respective modulated initial voltage to thereby:

regulate the respective one of the plurality of reference voltages during the respective one of the plurality of non-overlapping charge intervals in each of the plurality of voltage modulation periods; and maintain the respective one of the plurality of modulated voltages outside the respective one of the plurality of non-overlapping charge intervals in each of the plurality of voltage modulation periods.

18. The wireless device of claim 17, wherein the voltage amplifier is further configured to generate the respective modulated initial voltage based on a first feedback voltage indicating the respective one of the plurality of modulated voltages generated by the respective one of the plurality of voltage modulation circuits.

19. The wireless device of claim 18, wherein the voltage amplifier is further configured to generate the respective modulated initial voltage based on a second feedback voltage indicating the respective one of the plurality of modulated voltages received by a coupled load circuit.

20. A method for concurrently generating a plurality of modulated voltages in a multi-voltage power management integrated circuit (PMIC) comprising:

configuring each of a plurality of voltage modulation circuits to generate a respective one of a plurality of modulated voltages based on a battery voltage, a respective one of a plurality of reference voltages, and a respective one of a plurality of reference currents;

determining a respective one of a plurality of non-overlapping charge intervals in each of a plurality of voltage modulation periods for each of the plurality of voltage modulation circuits;

causing each of the plurality of voltage modulation circuits to receive the respective one of the plurality of reference voltages and the respective one of the plurality of reference currents during the respective one of the plurality of non-overlapping charge intervals; and preventing each of the plurality of voltage modulation circuits from receiving the respective one of the plurality of reference voltages and the respective one of the plurality of reference currents outside the respective one of the plurality of non-overlapping charge intervals.

* * * * *